United States Patent [19]

Stone

[11] Patent Number: 4,475,823
[45] Date of Patent: Oct. 9, 1984

[54] SELF-CALIBRATING THERMOMETER

[75] Inventor: W. Porter Stone, Walpole, N.H.

[73] Assignee: Piezo Electric Products, Inc., Cambridge, Mass.

[21] Appl. No.: 366,856

[22] Filed: Apr. 9, 1982

[51] Int. Cl.$^3$ ............................................ G01K 15/00
[52] U.S. Cl. ........................................ 374/1; 374/168
[58] Field of Search ................... 374/1, 129, 133, 170, 374/168, 173, 183; 324/DIG. 1, 130

[56] References Cited

U.S. PATENT DOCUMENTS

| | | | |
|---|---|---|---|
| 3,501,696 | 3/1970 | Riley | 324/130 X |
| 3,611,806 | 10/1971 | Hishikari | 324/129 |
| 3,791,204 | 2/1974 | List | 374/130 X |
| 3,882,725 | 5/1975 | Rao et al. | 374/172 X |
| 4,198,849 | 4/1980 | Siess et al. | 374/1 |

Primary Examiner—Herbert Goldstein
Attorney, Agent, or Firm—Joseph S. Iandiorio

[57] ABSTRACT

A calibration system for a temperature sensing probe in an electronic thermometer, including: a reference temperature element having a characteristic that varies as a function of temperature; a reference temperature sensing circuit, responsive to the reference element, for providing a reference signal representative of the temperature sensed by the reference element; a probe temperature sensing circuit responsive to the probe for providing a probe signal representative of the temperature sensed by the probe; means for releasably interconnecting the probe and the probe temperature sensing circuit; and comparator means for comparing the probe signal representative of the temperature sensed by the probe and the reference signal representative of the temperature sensed by the reference element; the probe temperature sensing circuit being responsive to the comparator means for adjusting the probe signal representative of the temperature sensed by the probe to match the reference signal representative of the temperature sensed by the reference element.

2 Claims, 4 Drawing Figures

FIG. I

SELF-CALIBRATING THERMOMETER

FIELD OF INVENTION

This invention relates to a calibration system for a temperature sensing probe in an electronic thermometer.

BACKGROUND OF INVENTION

Conventional mercury fever thermometers are being replaced by electronic thermometers which use a temperature-sensitive disposable probe to contact the human body. The probe has a characteristic which varies with temperature, and the characteristic is monitored by suitable circuitry in the electronic thermometer to provide an indication of the sensed temperature on a digital readout such as a liquid crystal display. Such thermometers have a number of advantages including eliminating the hazard of broken glass and uncontained mercury, reducing risk of contamination and eliminating the cost of sterilization. In addition, the temperature reading is quickly displayed in a matter of a few seconds, they are easier to read at low light levels, and they do not need to be shaken down after each use.

Typically, electronic thermometers utilize a probe which is removable and replaceable to provide for decontamination and for replacement of a malfunctioning probe. In some cases the entire probe is disposable. A problem arises when a replacement probe is not properly calibrated for the thermometer. The probes use a heat-sensitive element such as a thermistor and a substantial fraction of the cost of the disposable thermistor probes results from the need to adjust the resistance value of each thermistor element to within an accuracy far greater than can be maintained in production. Two methods are currently used to achieve the required accuracy of resistance of the thermistor elements. The first method consists of adjusting the resistance of each thermistor element by using a laser beam to trim away part of the ceramic wafer until the correct resistance value is achieved. The second method consists of sorting the thermistor wafers after production into matched pairs, each pair having resistance values which are above and below one half of the required value by the same amount, and then using such a matched pair of thermistors in series in each probe instead of a single thermistor. The two thermistors connected in series will have exactly the required resistance value. Both methods involve an extra selection process which is as costly or more costly than the production process itself, and the second method requires in addition the use of two instead of one thermistor element in each disposable probe.

SUMMARY OF INVENTION

It is therefore an object of this invention to provide an improved calibration system for matching a temperature sensing probe to an electronic thermometer.

It is a further object of this invention to provide such a calibration system which allows quick, easy calibration automatically upon engagement of the probe with the electronic thermometer.

It is a further object of this invention to provide such a calibration system which enables use of production probe elements such as thermistors without special sorting or trimming.

The invention results from the realization that a truly quick and accurate calibration of a probe can be made by providing a calibration system having its own reference element, comparing the temperature indicated by the two, and feeding back a corrective bias as a function of any difference between the two to adjust the temperature indicated by the probe to coincide with that indicated by the reference element.

The invention features a calibration for a temperature sensing probe in an electronic thermometer. There is a reference temperature element having a characteristic that varies as a function of temperature, and a temperature sensing circuit, responsive to the reference element, for providing a reference signal representative of the temperature sensed by the reference element. A probe temperature sensing circuit is responsive to the probe, for providing a probe signal representative of the temperature sensed by the probe. There are means for releasably interconnecting the probe and the probe temperature sensing circuit. Comparator means compares the probe signal, representative of the temperature sensed by the probe, and the reference signal, representative of the temperature sensed by the reference element. The probe temperature sensing circuit is responsive to the comparator means to adjust the probe signal, representative of the temperature sensed by the probe, to match the reference signal, representative of the temperature sensed by the reference element.

In a preferred embodiment, the reference element and the probe may each include a thermistor. The reference temperature sensing circuit may include a reference bridge circuit interconnected with the reference element and a reference amplifier responsive to the reference bridge circuit. The probe temperature sensing circuit may include a probe bridge circuit interconnected with the probe and a probe amplifier responsive to the probe bridge circuit. The probe temperature sensing circuit may further include an isolation amplifier circuit responsive to the comparator means for adjusting the gain of the probe amplifier to match the probe signal to the reference signal. Switch means interconnected in series between the comparator means and the probe amplifier are provided to disconnect the feedback from the comparator means to the probe temperature sensing circuit after calibration has been effected. A fault detector may be provided to indicate that a particular probe cannot be calibrated within a certain range or a period of time.

DISCLOSURE OF PREFERRED EMBODIMENT

Other objects, features and advantages will occur from the following description of a preferred embodiment and the accompanying drawings, in which.

The calibration system or circuit according to this invention is utilized in an electronic thermometer including conventional power supply, on-off switch, temperature probe, and conversion and display circuits. The power supply may include a small battery sufficient to run the conversion circuits and a LED or LCD display. The temperature probe may utilize a thermistor, temperature sensitive diodes, or other temperature sensing devices. The calibration system is effective in any electronic thermometer in which the temperature probe is removable and replaceable, either infrequently, occasionally, or regularly as in the case of a disposable probe.

The calibration system may utilize a reference bridge circuit which includes a reference thermistor and a probe bridge circuit which is releasably engageable with the probe thermistor. When the probe thermistor is plugged into the thermometer, the outputs of the two bridge circuits are compared. If there is any difference a corrective signal is fed back to provide an offsetting bias to the temperature indicating signal from the probe bride circuit to make it coincide with that from the reference bridge circuit. At this point the new probe thermistor is thus calibrated and a switch can be opened to interrupt any further correcting signals. The probe thermistor may then be used to measure human or other temperatures, and the output from the probe bridge circuit and any necessary amplifiers may be fed directly to a voltage to rate converter which provides an output signal whose frequency is proportional to the temperature. This voltage-controlled frequency signal is counted and used to drive a digital temperature display under the control of suitable logic.

The need for some form of calibration of the temperature probe can be shown from the fact that the resistance variation of thermistor materials, for example, is characterized by an exponential expression in the form of: $R(T) = TAe_{BT}$, where: $R(T)$ is the relative electrical resistance of the probe as a function of temperature; T is the absolute temperature, Kelvin; B is a material-related constant; and A is a constant of a particular probe. The B-constants for four commonly available materials are:

| Gulton L-5000 | B = .04738 |
| Omega No. 44034 | B = .04754 |
| Omega No. 44044 | B = .04738 |
| Omega No. 44008 | B = .04647 |

The B-constants are specific to a given probe material. Only the A-constant varies from probe to probe, depending upon the probe's exact size, electrode location and similar constructional details. The variations in the A-constant may be accommodated by adjusting the gain of a variable-gain amplifier.

Figure 1:
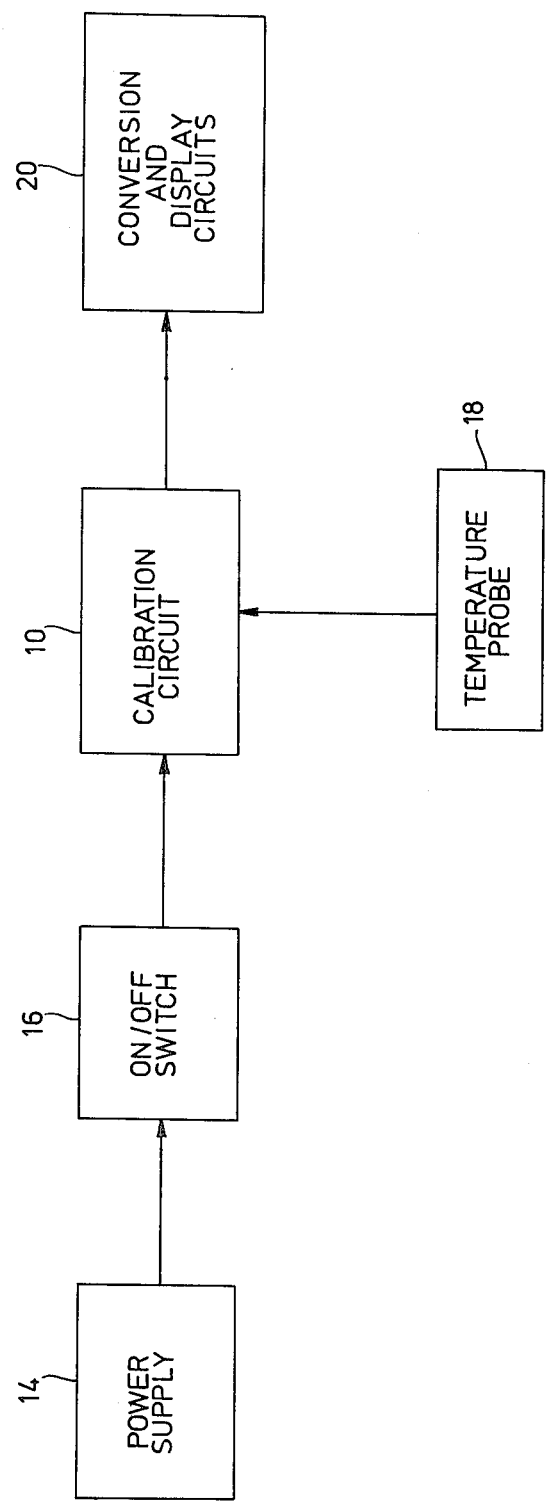
FIG. 1 is a block diagram of an electronic thermometer including a calibration circuit according to this invention.

In one embodiment, calibration circuit 10, FIG. 1, is utilized in an electronic thermometer system 12 including a conventional power supply 14, on-off switch 16, temperature probe 18, and conversion and display circuits 20. In operation, with switch 16 in the "on" position, power is supplied from power supply 14 to calibration circuit 10 and conversion and display circuits 20. Initially, when temperature probe 18 is interconnected with calibration circuit 10 a calibration switch is closed to effect the calibration. Then the switch is opened and temperature probe 18 may be used to measure temperature.

Figure 2:
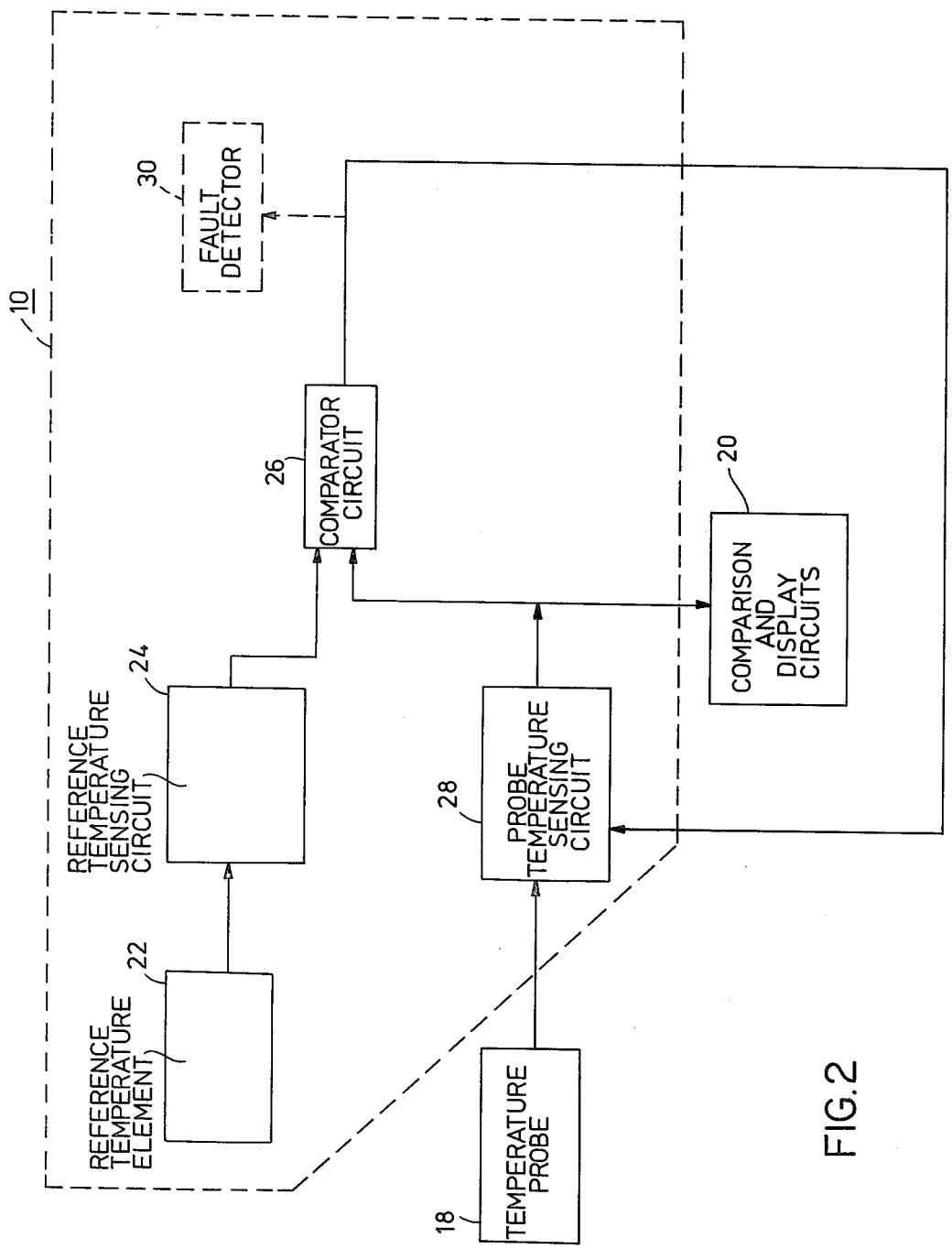
FIG. 2 is a more detailed block diagram of the calibration circuit of FIG. 1.

Calibration circuit 10 includes reference temperature element 22, FIG. 2, having a characteristic that varies with variations in temperature. These variations are sensed by reference temperature sensing circuit 24 which provides a signal representative of temperature to comparator circuit 26. Temperature probe 18 similarly has a characteristic which varies with variations in temperature, and probe sensing temperature circuit 28 responds to it to provide a signal representative of the temperature sensed by probe 18. These two signals are compared in comparator circuit 16, and any difference produces a corrective signal to circuit 28 to increase or decrease the level of the signal to coincide with that from circuit 24. At that point the probe 18 has been calibrated and temperature taking operations may now be undertaken.

Also included in calibration circuit 10 may be a fault detector 30 which monitors the output of comparator circuit 26. When that output does not reach zero within a predetermined period then an indication is made that probe 18 is faulty.

Figure 3:
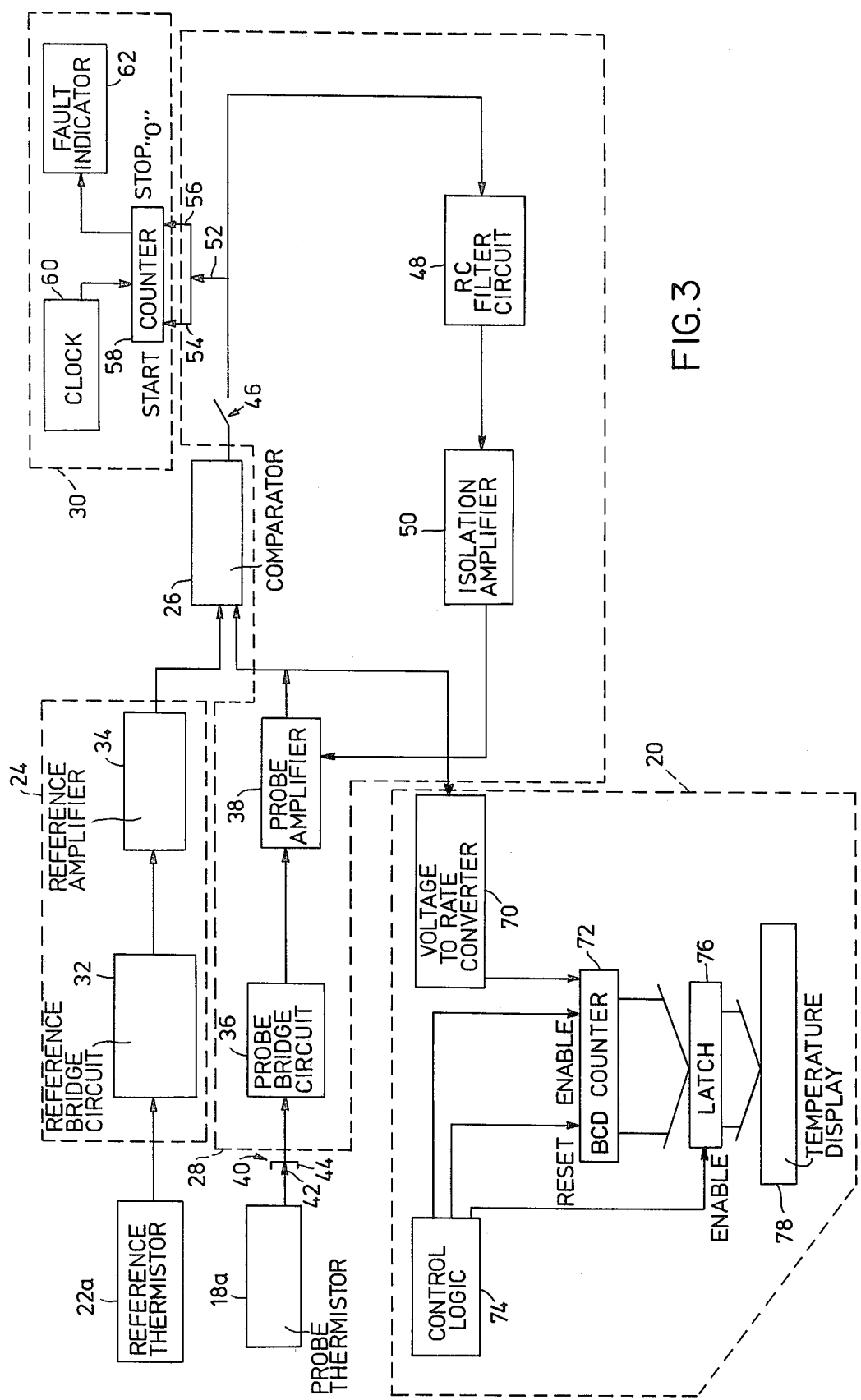
FIG. 3 is a more detailed block diagram of the sensing circuits and conversion and display circuits and fault detector of FIG. 2.

In one construction, reference element 22 includes a reference thermistor 22a, FIG. 3, and temperature probe 18 includes probe thermistor 18a. Reference temperature circuit 24 includes reference bridge circuit 32, which is responsive to thermistor 22a, and reference amplifier 34, which receives the output of bridge circuit 32, provides a signal representative of the temperature sensed by thermistor 22a to comparator 26. Probe temperature sensing circuit 28 includes probe bridge circuit 36, which is responsive to thermistor 18a, and probe amplifier 38 which receives the output from bridge circuit 36 and provides a signal indicative of the temperature sensed by thermistor 18a to comparator 26. Some releasable interconnecting means 40, such as a jack 42 and socket 44, is provided to releasably interconnect thermistor 18a with bridge circuit 36. The output of comparator 26 is delivered though switch 46 and filter circuit 48 to isolation amplifier 50, which provides a corrective bias to probe amplifier 38 to increase or decrease its output signal so that it coincides with that from reference amplifier 34 and nulls the output of comparator 26. When this occurs the system is calibrated. Switch 46 is then opened, and the system is now ready for use in measuring unknown temperatures.

During the calibration period, any output from comparator 26 is fed over line 52 to the start and stop inputs 54 and 56 of counter 58 in fault detector 30. Any output from comparator 26 causes counter 58 to begin counting pulses from clock 60. As soon as the two signal inputs to comparator 26 match, the output of comparator 26 goes to zero and this condition, reflected on line 56, causes counter 58 to stop counting. If counter 58 stops counting before a full count, no output is provided. However, if counter 58 is able to count to a full count, for example 100 milliseconds, before receiving the stop signal, a signal is provided to fault indicator 62 indicating that thermistor 18a is faulty.

Conversion and display circuit 20 includes voltage-to-rate converter 70, which may be for example a voltage-controlled oscillator, which provides an output whose frequency varies in proportion to the amplitude of the voltage signal which it receives from probe amplifier 38. That signal in turn is representative of the temperature sensed by thermistor 18a. Binary coded decimal counter 72 accumulates the count from voltage to rate converter 70 as enabled by control logic 74, and provides in latch 76 a representation of the temperature sensed by thermistor 18a. Upon enablement from control logic 74 this temperature is read out to temperature display 78, which may for example be a liquid crystal display.

Figure 4:
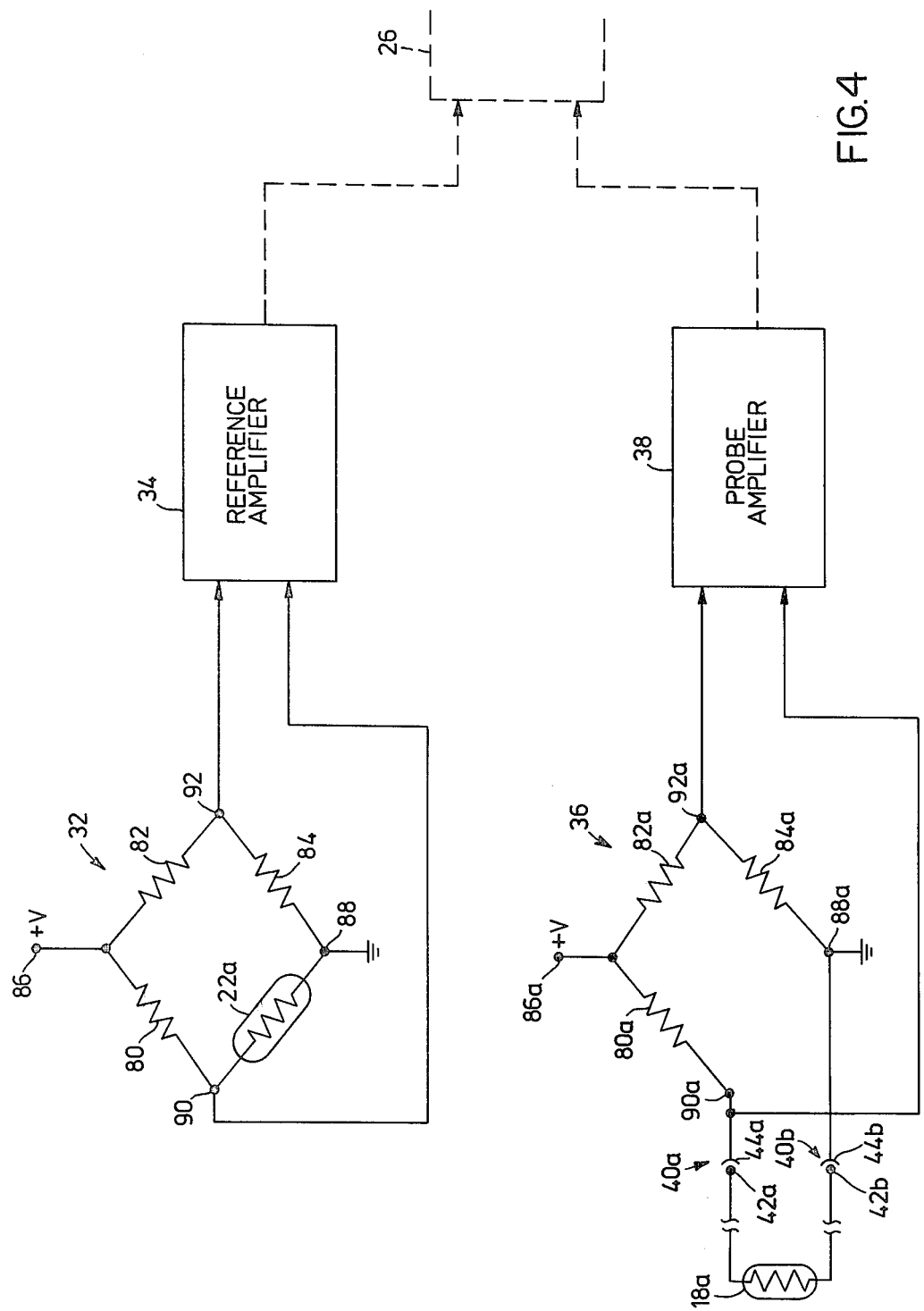
FIG. 4 is a detailed schematic diagram of the thermistors and bridge circuits of FIG. 3.

Reference bridge circuit 32, FIG. 4, may include three resistors 80, 82, 84, arranged in a bridge configuration with thermistor 22a. V+ is supplied across terminals 86 and 88; terminals 90 and 92 are interconnected with reference amplifier 34. Probe bridge circuit 36 includes three resistors 80a, 82a, 84a, identical with resistors 80, 82 and 84, and combined in a bridge circuit with thermistor 18a, which is removably interconnected with the bridge by means of connector 40a, e.g., jacks 42a, 42b which engage with sockets 44a, 44b. V+ is applied across terminals 86a and 88a; terminals 90a and 92a are interconnected with probe amplifier 38.

Other embodiments will occur to those skilled in the art and are within the following claims:

What is claimed is:

1. A calibration system for a temperature sensing probe in an electronic thermometer comprising:
    a reference temperature element having a characteristic that varies as a function of temperature;
    a reference temperature sensing circuit, responsive to said reference element, for providing a reference signal representative of the temperature sensed by said reference element;
    a probe temperature sensing circuit responsive to said probe for providing a probe signal representative of the temperature sensed by said probe;
    means for releasably interconnecting said probe and said probe temperature sensing circuit;
    comparator means for comparing said probe signal representative of the temperature sensed by said probe and said reference temperature signal representative of the temperature sensed by said reference element; said probe temperature sensing circuit being responsive to said comparator means for adjusting said probe signal representative of the temperature sensed by said probe to match said reference signal representative of the temperature being sensed by said reference element; and
    fault detector means including means for monitoring the output of said comparator means and means responsive to said means for monitoring for indicating that output from said comparator means has not dropped to zero within a predetermined time to indicate that a said probe cannot be calibrated.

2. A calibration system for an electronic thermometer comprising:
    a reference temperature element having a characteristic that varies as a function of temperature;
    a reference temperature sensing circuit, responsive to said reference element, for providing a reference signal representative of the temperature sensed by said reference element;
    a temperature-sensitive probe having a characteristic that varies as a function of temperature;
    a probe temperature sensing circuit responsive to said probe for providing a probe signal representative of the temperature sensed by said probe;
    means for releasably interconnecting said probe and said probe temperature sensing circuit;
    comparator means for comparing said probe signal representative of the temperature sensed by said probe and said reference temperature signal representative of the temperature sensed by said reference element; said probe temperature sensing circuit being responsive to said comparator means for adjusting said probe signal representative of the temperature sensed by said probe to match said reference signal representative of the temperature being sensed by said reference element; and
    fault detector means including means for monitoring the output of said comparator means and means responsive to said means for monitoring for indicating that output from said comparator means has not dropped to zero within a predetermined time to indicate that a said probe cannot be calibrated.

* * * * *